Feb. 18, 1930.   A. L. GOLDENSTAR   1,748,017
STRUCTURAL JOINT
Filed Sept. 28, 1928
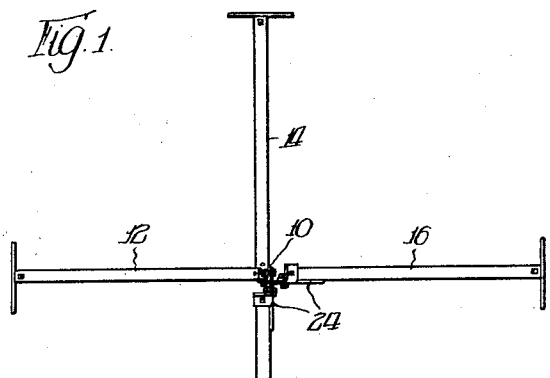
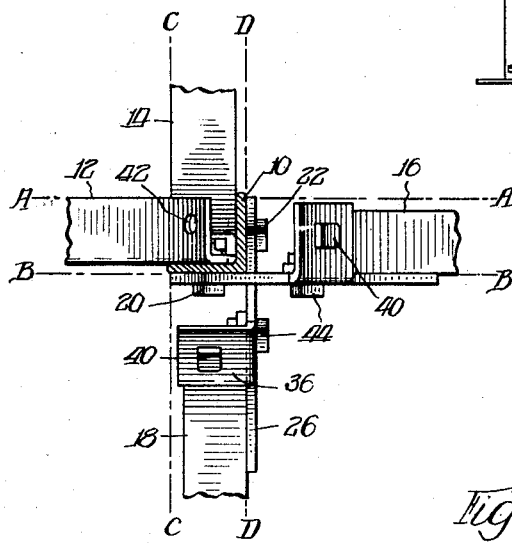
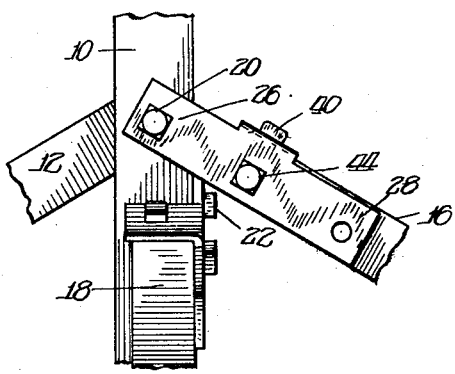
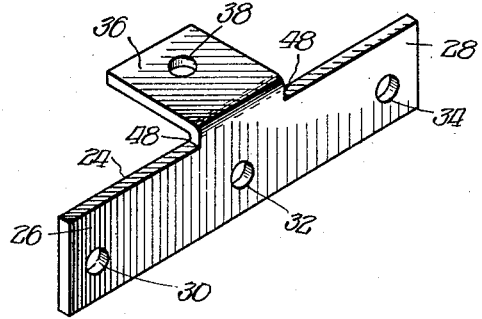
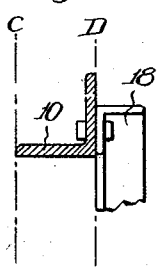
Inventor:
Arthur L. Goldenstar,
By D. Anthony Urina
Atty Patented Feb. 18, 1930

1,748,017

UNITED STATES PATENT OFFICE

ARTHUR L. GOLDENSTAR, OF DULUTH, MINNESOTA

STRUCTURAL JOINT

Application filed September 28, 1928. Serial No. 309,067.

This invention relates to joints or connecting devices and is illustrated herein as embodied in a device suitable for use in connecting metal bracing elements to an upright supporting element. A device of this character is susceptible to being employed in a variety of uses, as for example, in securing braces to metal fence posts, in similarly securing together the structural member of bridges, buildings, etc.

It is often desirable in the erection of metal structures to brace a supporting member from a number of different directions and to this end various means and devices have heretofore been employed. Guy wires, for example, are old and well-known in the art, but in many instances they are unsatisfactory by reason of the fact they are not strong enough to meet and withstand the demands imposed upon them in a heavy building structure. It is also a common expedient to brace a supporting member by means of beams or girders extending downwardly and outwardly from a point adjacent to the top of the supporting member, yet heretofore these heavy braces have likewise been open to a number of different objections; for example, if several bracing members, extending from different directions, are connected directly to the upright member, they interfere seriously during the subsequent operation of attaching to the upright member the structure intended to be supported thereby, and, in many instances, it is impossible satisfactorily to connect the bracing members directly to the supporting member. Thus, where all of the members consist of angle bars, a flange to flange connection may be effected between a supporting bar and a plurality of the bracing bars in such a manner that the upper end portions of the bracing members are disposed within the angular recess of the supporting bar, but since the angle bar has only two inner flange faces extending at right angles to one another, only those bracing bars extending from the two directions in which the flanges extend can be secured in the indicated manner, and bracing bars extending from other directions will confront the outside surfaces of the supporting bar, in which condition it is almost impossible to connect the members without placing them flange to flange with outer flange faces of the members in contact with each other. In this position flanges of the bracing members extend outwardly, at right angles to the outer flange faces of the supporting member thereby presenting an awkward and unsightly connection. In fact, when the bracing members are connected thuswise, they occupy considerable space, and interfere with the attachment to the supporting member of the materials or structure intended to be supported thereby.

Thus, in heretofore connecting a supporting member, angular in cross-section, with a plurality of bracing members, also angular in cross-section, it has been impossible to align the supporting member with bracing members extending in opposite directions therefrom. This, by reason of the fact that the brace connected to an inside flange face of the supporting member, is necessarily offset from, and hence out of alignment with the oppositely extending brace which is, perforce connected to an outside flange face of the supporting member.

In view of the foregoing considerations, the invention has for an important object thereof the provision of an improved article of manufacture comprising a connection or joint adapted for use in securing flanged bracing members to flanged supporting members, and for other similar uses. In the illustrated embodiment of the invention, the article comprises a rectangular bracket for attachment to a flange of a supporting member and to a flange of a bracing member, and an arm extending at right angles from the bracket and adapted for attachment to one of the flanges of the supporting member and the bracing member not engaged by the bracket.

An important feature of the invention consists in constructing the bracket and bracket arm of the joint in such a manner that when in use, a flanged bracing member held by the joint will be in alignment with a flanged supporting member also held by the joint, and will additionally be aligned with another flanged bracing member extending from an opposite direction and secured flange to flange with the supporting member. The importance of such a feature has already been pointed out.

In another aspect, a feature of the invention consists in the provision of a structural assemblage in which a flanged supporting member is braced from opposite directions by means of flanged bracing members, connected to the supporting member in such a manner that the latter member and the bracing members are aligned with each other.

Other features and objects of the invention will become apparent from a reading of the following specification in the light of the accompanying drawings in which—

Figure 1 shows in plan view, a supporting member braced from a plurality of opposite directions;

Figure 2 is an enlarged plan view of the supporting member of Figure 1 and of fragments of the bracing members showing the manner in which the bracing members are connected to the supporting members;

Figure 3 is a view in side elevation showing the assemblage illustrated in Figure 2;

Figure 4 is a view in perspective of a connection or joint that is used in securing certain of the bracing members to the supporting member; and Figure 5 is a plan view of the supporting member of Figure 1 having a bracing member secured thereto in accordance with present day practice.

As shown in the drawings, the reference numeral 10 indicates an upright supporting member of a type which comprises a plurality of angularly disposed flanges; the flanges in these members are generally disposed at right angles to one another and the members themselves are commonly termed "angle bars." Supporting members of this type are employed in a great variety of uses, and quite often it is desirable or even essential that the members be supplied with a plurality of braces extending from opposite directions. The braces employed are generally similar in design to the supporting member and in Figure 2 there is shown a plurality of bracing members 12, 14, 16 and 18 arranged to brace the upright 10 from all four directions.

Now in connecting the braces to the supporting member, the inside flange faces of the supporting member may be utilized in providing flange to flange connections between the supporting member and the braces 12 and 14, the ends of which rest within the angular recess of the supporting member. Bolts or other suitable fasteners 20 and 22 may be employed for the purpose of securing respectively the flanges of the braces 12 and 14 to the flanges of the supporting member 10. It will be seen that the two bracing members connected in this manner fit snugly within the angular recess of the member 10 and that the side edges of the bracing members do not project beyond the side edges of the supporting member, which is to say, that the member 12 is disposed between a plane B—B, within which lies an outer flange surface of the supporting member 10, and a plane A—A, which passes parallel to the plane B—B and includes an edge of the other of the flanges, all as clearly shown in Figure 2. Similarly, the bracing member 14 which is connected to the other inner flange surface is disposed entirely between planes defined by the lines C—C and D—D.

Thus, it will be seen that two of the bracing members may be conveniently secured to the supporting member 10 without their edges projecting beyond the edges of the supporting member. If, however, it is desired to brace the support 10 by means of the members 16 and 18 extending oppositely to the members 12 and 14, a difficult problem is presented, and it will be found impossible to connect the members 16 and 18 directly to the supporting member 10 without producing at the same time a connection that is awkward, bulky, and unsightly. For the only manner in which the braces 16 and 18 can be directly secured to the support 10 is by means of a flange to flange connection such, for example, as that illustrated in Figure 5, wherein the member 18 is shown connected in a flange to flange relationship with the support, in which position the brace 18 lies completely without the space included between the planes C—C and D—D.

In order to provide means whereby the braces 16 and 18 may be conveniently and efficiently secured to the outer flange faces of the support 10 in such a manner as to lie within the spaces between planes A—A. B—B, and C—C, D—D. There is provided a connection or joint 24 of a type clearly illustrated in Figure 4. As shown in the latter figure, the joint comprises a flat rectangular bracket having oppositely extending connecting portions 26 and 28 and apertured at 30, 32 and 34 to receive fasteners. An arm 36 apertured at 38 extends outwardly at right angles to the bracket from the center of one side, the arm being formed integrally with the bracket. In use, the brace 16 is positioned in proximity to the supporting member 10 with outer flange surfaces of the supporting member and the brace disposed in the same plane, and, with the brace so held, the joint 24 is mounted to connect the brace to the supporting member. When this is done, the connecting portion 26 of the bracket is secured to an outer flange face of the support by means of the bolt 20 extending through the aperture 30 and the brace is secured to the bracket by means of a bolt 40 (Figures 2 and 3) extending through the aperture 38 and through a similar aperture formed in the end of the brace 16, an aperture of this latter type being shown at 42 in Figure 2. A supplementary securing bolt 44 is arranged to extend through the aperture 32 and thence through a similar aperture formed in the flange of the brace 16. When the brace has been connected to the support in this manner, it is disposed, as will be observed in Figure 2, in alignment with the brace 12 and the support 10, and between the vertical planes defined by the lines A—A and B—B. The brace 18 may be secured to the support in a manner identical to that in which the brace 16 is secured, and accordingly no detailed description of the mounting of the brace 18 will be given.

It is to be observed that the opposite end portions of 26 and 28 of the bracket are of equal dimensions whereby the joint may be used in connecting the brace 16 to the support 10, or may be reversed end for end, and utilized in securing in place an oppositely extending brace.

It will be often found desirable to have the bracing members 12, 14, 16 and 18 extend approximately horizontal or to lift them to an elevated position during their erection and in order to procure for these elements the greatest degree of vertical swinging movement, the bracket arm 36 (which is provided for the purpose of increasing the strength of the joint) is offset from the side edge of the bracket as indicated by the reference numeral 48 in Figure 4. This offsetting does not weaken the joint and insures the greatest amount of movement between the members of the assemblage.

Although the invention has been described herein with particular reference to angle bar members, it is to be understood that the invention contemplates employment in connection with flange structural elements of other types and that it also contemplates employment in various structural organizations, as for example, bridges, buildings, metal fences, etc. Likewise, it is to be understood that the invention contemplates varying somewhat the shape and character of the joint in order to accommodate the joint to various uses and to various other types of structural members without departing in any wise from the scope of the invention.

Having thus described my invention, what I claim as new and desire to secure by Letters Patent of the United States is:

1. A structural assemblage having, in combination, a plurality of structural elements each of which is provided with a plurality of surfaces disposed in angular relation with one another, and a structural joint adapted to connect said elements, said joint comprising an elongated bracket provided with a plurality of symmetrically spaced fastening receiving apertures therein for use in attaching the bracket to a face of both of the structural elements, and a bracket arm extending from the bracket at an angle corresponding to the angle between the plurality of angularly disposed surfaces of one of the structural elements, said bracket arm being provided with a fastening receiving aperture for use in attaching the arm to a surface of the structural elements disposed adjacent to the surface to which is attached the bracket.

2. A structural assemblage having, in combination, a supporting member comprising a plurality of flanges disposed at an angle to one another, a plurality of bracing members of the same shape and construction as the supporting member and adapted to extend thereto from opposite directions, one of the bracing members being secured flange to flange with the supporting member, and a joint adapted to secure the oppositely disposed bracing member to the supporting member in such a manner that the supporting member and both of the oppositely disposed bracing members are in alignment with one another.

3. A structural assemblage having, in combination, a supporting member comprising a plurality of flanges disposed at an angle to one another, a plurality of bracing members of the same shape and construction as the supporting member and adapted to extend thereto from opposite directions, one of the bracing members being secured flange to flange with the supporting member, and a joint adapted to secure the oppositely disposed bracing member to the supporting member in such a manner that the supporting member and both of the oppositely disposed bracing members are in alignment with one another, said joint being constructed and arranged to permit pivotal movement of the bracing member relatively to the supporting member.

Signed at Duluth, Minnesota, this 19th day of September, 1928.

ARTHUR L. GOLDENSTAR.